Dec. 5, 1967 D. P. GRUDOSKI 3,356,218
LIQUID FILTERING APPARATUS
Filed Oct. 21, 1965 2 Sheets-Sheet 1

INVENTOR.
DANIEL P. GRUDOSKI
BY
Ely, Golrick & Flynn
ATTORNEYS

Dec. 5, 1967 D. P. GRUDOSKI 3,356,218
LIQUID FILTERING APPARATUS
Filed Oct. 21, 1965 2 Sheets-Sheet 2

INVENTOR.
DANIEL P. GRUDOSKI
BY Ely, Golrick & Flynn
ATTORNEYS

United States Patent Office 3,356,218
Patented Dec. 5, 1967

3,356,218
LIQUID FILTERING APPARATUS
Daniel P. Grudoski, R.F.D. 1, Hartstown, Pa.
Filed Oct. 21, 1965, Ser. No. 499,708
1 Claim. (Cl. 210—167)

ABSTRACT OF THE DISCLOSURE

Two combinations of deep fat fryers with continuously operable portable cooking oil filtering circulating apparatus, each including an electric motor, an oil centrifuge and submerged centrifugal oil pump with centrifuge basket shaft and pump impeller shaft vertically aligned and coupled for simultaneous drive by the motor shaft; the basket cylindrical wall perforated and lined with filter paper. The first form including a fryer vat, a formed tubular support stand with open base surrounding the vat opening and paired uprights with two vertically adjustable brackets clamped thereon above the vat for the motor and therebelow a centrifuge-pump assembly; the pump submerged in the vat for direct intake of oil and discharging through a conduit to a valved spout into the centrifuge basket, surrounded by a container jacket gravity draining oil back to the vat. The second form comprising a castered floor-supported cart, the electric motor mounted within the cart frame with shaft upwardly extending through and the centrifuge on the cart top; the centrifugal pump coaxially mounted within, and with intake adjacent the bottom of, the centrifuge container jacket, a lower impeller shaft portion rotationally sealed to and extending through the jacket bottom coupled to the motor shaft, an upper impeller shaft portion serving as the basket mounting shaft; the pump discharging through a conduit and valved spout to a fryer vat above the centrifuge; and a fryer vat gravity draining from its bottom through a conduit to the basket.

---

This invention relates to liquid filtering apparatus, and particularly to a self-contained portable apparatus for use with restaurant-size deep fat fryers to continuously circulate and filter the cooking oil.

Various arrangements have been proposed heretofore for filtering and recirculating the cooking oil used in deep fat fryers in restaurants. Many such prior arrangements were intended as permanent installations requiring an expensive special design of the deep fat fryer itself. Also, in such prior arrangements the actual filtering did not involve a substantial pressurized flow of the cooking oil and the filtering action was not as thorough as desired. For these and other reasons, the prior arrangements have not provided an effective, economical and practical solution to the problem of filtering the cooking oil used in deep fat fryers in restaurants and the like.

The present invention overcomes these difficulties by providing a self-contained portable filtering apparatus which may be used with any conventional deep fat fryer without requiring any substantial modification or special design of the fryer itself in order to accommodate the filtering apparatus. The present apparatus includes a centrifugal filter for more effective filtering of the cooking oil continuously between the fryer vat and the filter. The entire apparatus may be easily handled as a unit for use with any selected fryer vat in the kitchen, and it may be changed quickly from one fryer vat to another.

While it is intended particularly for use with deep fat fryers, the present filtering apparatus also may be used for other liquid filtering operations, particularly in connection with the preparation of food.

Accordingly, it is a principal object of this invention to provide a novel and improved liquid filtering apparatus.

Also, it is an object of this invention to provide such an apparatus which is especially adapted for use with restaurant-size deep fat fryers to continuously filter and circulate the cooking oil.

Further objects and advantages of this invention will be apparent from the following detailed description of two presently-preferred embodiments thereof, which are illustrated in the accompanying drawings.

Figures 1, 2:
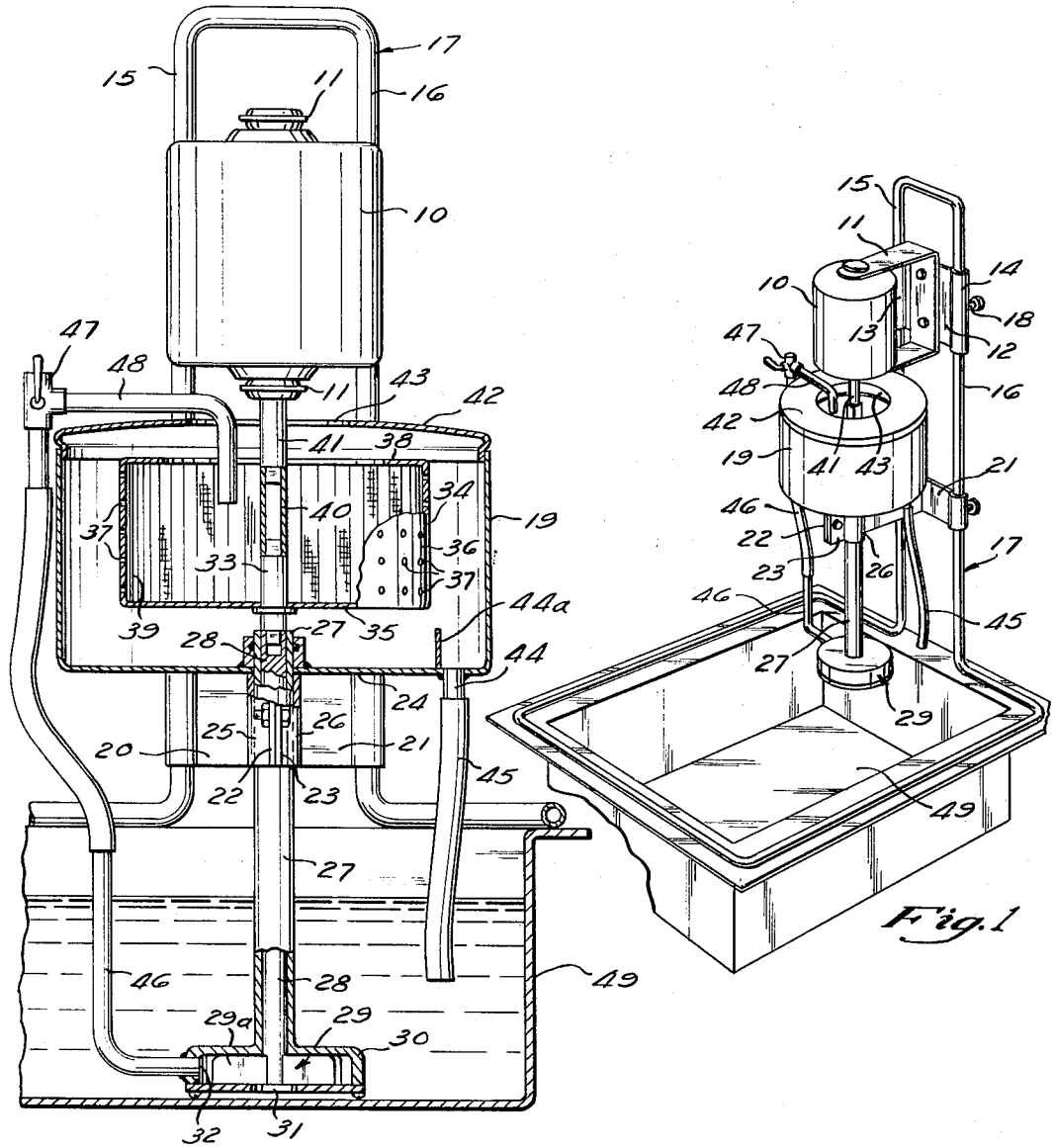
FIGURE 1 is a perspective view showing one embodiment of the present apparatus.
FIGURE 2 is a view on a larger scale, partly in front elevation and partly in vertical section of the FIG. 1 apparatus.

Referring first to FIGS. 1 and 2, the embodiment of the present invention shown there includes an electric motor 10 supported by a generally U-shaped bracket 11. This bracket is attached to a support plate 12 having sleeve-like guides 13 and 14 at its opposite ends which are slidable along the opposite, upstanding tubular legs 15 and 16 of a support frame 17. The motor support plate 12 is provided at both guides 13 and 14 with locking screws 18 which enable it to be releasably secured at any desired vertical position on the support frame 17.

The apparatus includes a cylindrical centrifuge jacket or container 19 supported below the motor 10 by a pair of confronting generally L-shaped support plates 20 and 21 which are similarly adjustably mounted respectively on the upstanding legs 15, 16 of the support frame. These plates 20, 21 present abutting legs 22, 23 on which the bottom 24 of the container 19 rests. These legs 22, 23 are bolted together at their outer ends and near this location they are formed with respective integral semicircular segments 25 and 26 which together define a vertical opening through which a cylindrical sleeve 27 extends.

Sleeve 27 surrounds the rotary drive shaft 28 of a centrifugal pump 29 of conventional design. This pump includes a stationary housing 30, having a central inlet opening 31 at the bottom and an outlet opening 32 at one side, and a rotary impeller 29a attached to the lower end of shaft 28.

Sleeve 27 and the pump drive shaft 28 extend up in liquid-tight fashion through a central opening in the bottom wall 24 of the container 19. The upper end of shaft 27 is coupled to the lower end of a shaft member 33 attached to a filter basket or drum 34 disposed within the container. This drum has a flat circular bottom wall 35, a cylindrical side wall 36 extending up from the bottom wall and having perforations 37, and an annular top wall 38 which overlies the interior of the drum only near the side wall 36. A web 39 of porous filtering material, preferably filter paper, extends across the inside of the side wall 36 of the drum. This drum and the filter paper together constitute a rotatable centrifugal filter in the present apparatus.

The upper end of shaft member 33 is connected through a suitable flexible and resilient coupling 40 to the drive shaft 41 of motor 10. With this arrangement, the filter drum 34 and the pump impeller 29a are driven in unison with the motor shaft 41.

The motor 10, filter drum 34 and the pump impeller 29a are coaxial with one another to provide a compact and simplified assembly of the rotating parts in the present apparatus.

The container or jacket 19 is provided with a suitable removable cover 42 having a central opening 43 for passing the motor shaft 41. Container 19 also has a discharge opening 44 in its bottom wall, and conduit 45 extends down from this opening. A baffle 44a is provided near the outlet opening 44 to direct the cooking oil, which tends to flow in a circular path around the inside of the side wall of container 19, into the opening 44.

A suitable conduit 46 extends from the pump outlet 32 up to one port of a control valve 47. Another conduit 48 extends from another port of this valve across the top cover 42 of container 19 and down through the central opening 43 in this cover into the interior of the filter drum.

In the use of this filtering apparatus with a relatively large, restaurant-size deep fat fryer, the base of the support frame 17 rests on top of the fryer vat 49. The pump 29 is lowered to the bottom of the fryer vat. A suitable filtering aid powder, such as fuller's earth, is introduced into the interior of the filter drum and moves out centrifugally to cover the inside of the filter paper 39 on the inside of the drum. The cooking oil within the vat is drawn into the pump inlet opening 31 and is discharged by the motor driven pump impeller 29a out through the pump outlet 32, from which it flows up through conduit 46, valve 47 and conduit 48 into the interior of the filter drum 34. Here the cooking oil is forced out centrifugally through the filter paper 39 and the side perforations 37 in the drum and then down into the bottom of container 19. The filtered cooking oil then flows by gravity out through the bottom opening 44 in container 19 and down through conduit 45 back into the cooking vat.

Figure 3:
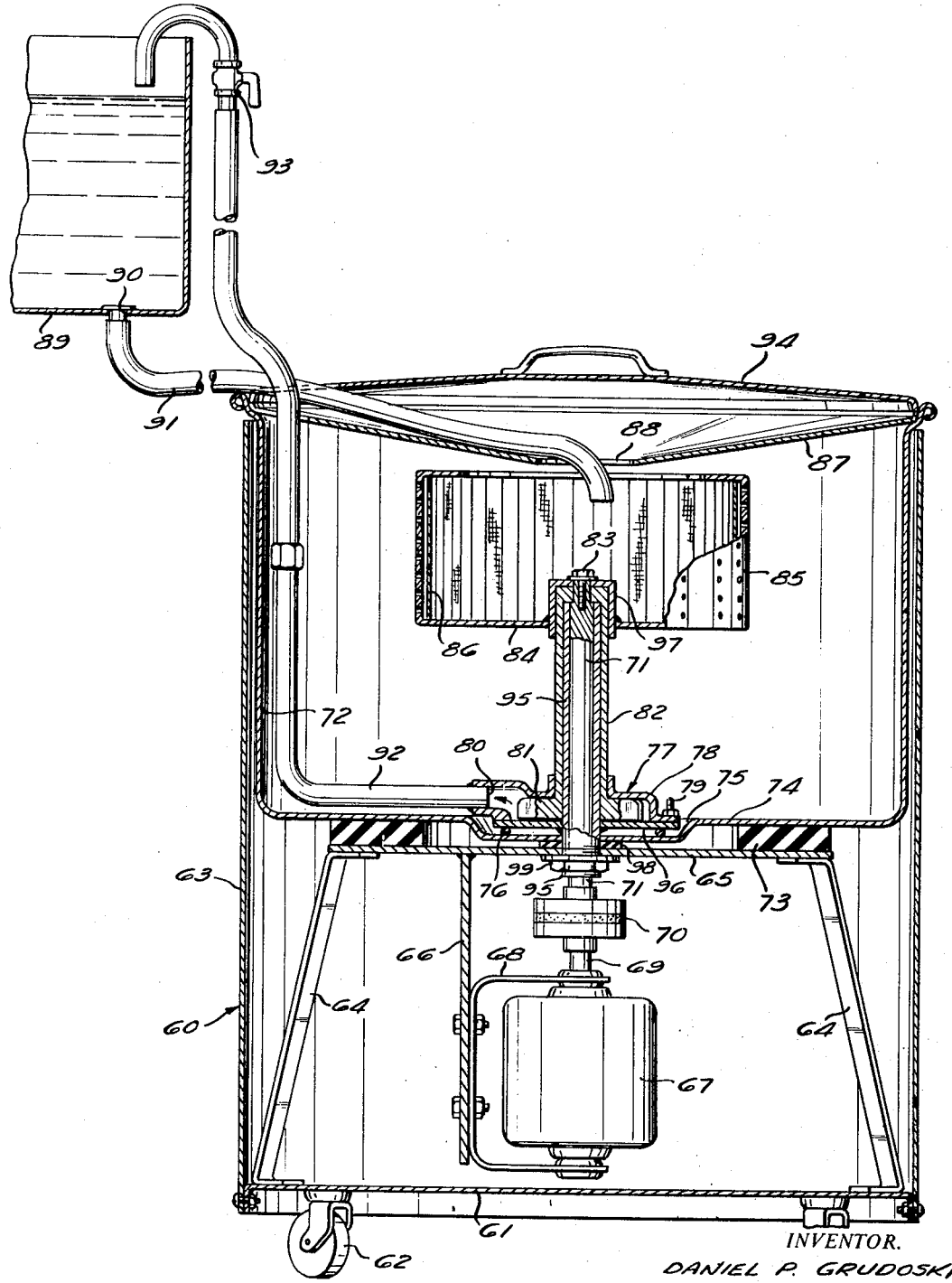
FIGURE 3 is a vertical section of a second embodiment of the present apparatus.

FIGURE 3 shows a second embodiment of this invention in which all of the operating parts of the apparatus are mounted within a roll-around cart 60. This cart comprises a flat bottom wall 61, mounted on casters 62, and an upstanding cylindrical side wall 63. Within the cart is located a support frame comprising a plurality of rigid legs 64 attached to and extending up from the bottom wall 61, a horizontal top plate 65 attached to and extending between the upper ends of the legs 64, and a vertical plate 66 attached to and extending down from the top plate 65.

An electric motor 67 is supported by a generally U-shaped bracket 68, which is bolted to the support framework plate 66. The shaft 69 of this motor is coupled through a suitable flexible coupling 70 to the lower end of a shaft 71, which extends up through a stationary tubular shaft housing 95.

A generally cylindrical container 72 is supported above the top plate 65 of the support framework by a rubber mounting ring 73. The bottom wall 74 of this container has a depression 75 having a central opening which passes the shaft housing 95. A flat plate 96 is welded to the shaft housing 95 just above this depression 75 and an O-ring 76 is sealingly engaged between this plate and the depressed portion of the bottom wall of container 72.

A centrifugal pump 77 is positioned overlying this plate 96. This pump comprises a housing 78, which is attached to plate 96 at mounting studs 79 on the latter. The pump housing has an inlet opening (not shown) at one side, an outlet opening 80 at the opposite side. The pump has a rotary impeller 81 within the housing. The pump impeller 81 has an upstanding, integral, hollow shaft 82 having a close rotational fit on the stationary shaft housing 95. A cap 97 welded to the filter drum 84 receives the upper end of pump shaft 82. A bolt 83 connects the upper end of shaft 71 and the upper end of pump shaft 82 to this cap for rotataion of these two shafts, the drum 84 and the pump impeller 81 in unison.

The filter basket or drum 84 has a cylindrical perforated side wall 85. A porous liner 86 of filter paper extends across the inside of this perforated side wall.

A sealing gasket 98 is engaged between the depressed bottom wall of container 72 and the top wall 65 of the support framework. A nut and washer assembly 99 on the threaded lower end of shaft housing 95 clamps the parts together in liquid-tight fashion.

If desired, a sleeve bearing (not shown) may be sealingly engaged between the top of the pump housing 78 and the pump shaft 82 to prevent leakage there.

The motor, pump and filter drum are all coaxial with each other, as in the first-described embodiment.

The container 72 is provided with a funnel-shaped top plate 87 having a central opening 88 and a removable cover plate 94 overlying plate 87.

This apparatus is shown connected to a deep fat fryer vat 89 having an outlet opening 90 in the bottom. A conduit 91 may be provided, extending from this opening down through the opening 88 in the top plate 87 of container 72 into the interior of the filter drum. Alternatively, the cover plate 94 may be removed and the opening 88 in the top plate 87 positioned directly below the bottom opening 90 in the fryer vat. With either of these arrangements, cooking oil flows by gravity out of the bottom of the fryer vat 89 into the interior of the filter drum 84 and then passes centrifugally out through the filter paper 86 and the perforated side wall 85 of the filter drum and then down into the bottom of container 72. The filter paper 86 is covered with filtering powder in the same manner as described for the embodiment of FIGS. 1 and 2.

A conduit 92 extends from the pump outlet 80 up through the top plate 87 and cover plate 94 to the top of the fryer vat 89. This conduit is provided with a suitable control valve 93. The filtered cooking oil is pumped from the bottom of container 72 back up to the fryer vat 89 to provide continuous recirculation of the cooking oil.

From the foregoing description it will be evident that each of the illustrated embodiments of the present invention provides a self-contained, portable unit for use with any conventional restaurant-size deep fat fryer to provide continuous filtering and circulation of the cooking oil. The support framework holds the motor and the container properly positioned with respect to each other, and the shaft coupling assembly positions the pump and the centrifugal filter properly with respect to each other and with respect to the container and the motor, so that the entire apparatus may be handled easily as a unit. It may be readily applied to any conventional restaurant-size deep fat fryer with little or no modification of the latter, and it does not interfere with the operation and use of the fryer itself. The centrifugal operation of the filter in the present apparatus insures that the actual filtering takes place while the cooking oil is undergoing pressurized flow (under centrifugal force), and this provides a highly effective filtering action which removes odors, as well as sediment, from the liquid being filtered.

While two presently-preferred embodiments of this apparatus have been described in detail and illustrated in the accompanying drawings, it is to be understood that the apparatus is susceptible of structural embodiments differing from the particular embodiments disclosed without departing from the spirit and scope of the present invention.

I claim:

The combination with a deep fat fryer vat, of a portable continuous filtering apparatus, comprising:

a deep fryer vat;

a centrifugal filter comprising a jacket-container having therein a rotary basket drum with a perforated side wall for receiving a filter liner at the inside and having a vertically disposed drum shaft extending through the container bottom in rotationally sealed relation;

a centrifugal pump disposed below said drum and with a shaft substantially in alignment with the drum shaft at the bottom of said container, said pump having an inlet for receiving cooking oil and having an outlet;

a conduit discharging into the interior of said drum for passing cooking oil circulated from the fryer down into the drum to pass outward centrifugally through said filter liner and the perforated side wall of the drum down into the container for return to the fryer vat;

a drive motor disposed with a shaft in vertical alignment with and coupled to the shafts of the pump and to the drum for imparting rotation to both;

gravity drainage and pump discharge conduit means completing an oil circulation path between said drum and vat;

and movable portable frame means supporting the filter, pump and motor as a portable assembly in proximity to said vat;

said movable frame means comprising a stand having a base and a vertical upright portion and bracket means slideable adjustably secured on the upright portion supporting said filter and thereabove said motor; said pump dependent from said bracket means below said filter and having an open inlet; said frame supporting said pump for operation immersed in said vat; said conduit means comprising a pump discharge conduit leading from the pump upwardly and discharging into said basket, and a conduit depending from the bottom of said container into said vat gravitationally returning filtered oil from the container to the vat.

References Cited
UNITED STATES PATENTS

| | | | |
|---|---|---|---|
| 1,230,099 | 6/1917 | Bingham | 210—416 |
| 1,648,983 | 11/1927 | Elrod | 210—196 |
| 2,733,815 | 2/1956 | Kwochka et al. | 210—416 X |
| 3,100,747 | 8/1963 | Hall | 210—167 |
| 3,172,850 | 3/1965 | Englesberg et al. | 210—416 X |

REUBEN FRIEDMAN, *Primary Examiner.*

J. L. DE CESARE, *Assistant Examiner.*